United States Patent [19]
Fukuchi et al.

[11] Patent Number: 5,354,497
[45] Date of Patent: Oct. 11, 1994

[54] LIQUID CRYSTAL DISPLAY

[75] Inventors: Shunsei Fukuchi, Nara; Kenji Nishida, Fushimi; Makoto Iwamoto; Hiroyuki Nagano, both Yamatokoriyama; Kenji Misono, Nara; Kyouhei Isohata, Yamatokoriyama, all of Japan

[73] Assignee: Sharp Kabushiki Kaisha, Osaka, Japan

[21] Appl. No.: 49,269

[22] Filed: Apr. 19, 1993

[30] Foreign Application Priority Data

Apr. 20, 1992 [JP] Japan ................................. 4-099261

[51] Int. Cl.⁵ ...................... G09K 19/52; G02F 1/1333
[52] U.S. Cl. .................................. 252/299.01; 359/74
[58] Field of Search ................ 252/299.01; 428/1; 359/74

[56] References Cited

U.S. PATENT DOCUMENTS 5,237,439  8/1993  Misono et al. ....................... 359/74

FOREIGN PATENT DOCUMENTS 55-114563  9/1980  Japan .
59-204545  11/1984  Japan .
60-260019  12/1985  Japan .

*Primary Examiner*—Shean Wu
*Attorney, Agent, or Firm*—David G. Conlin; Peter F. Corless

[57] ABSTRACT

A liquid crystal display according to the present invention has a pair of plastic substrates opposing each other and a liquid crystal sandwiched therebetween. A hard coat layer made from a resin composition including fine particles of silicon oxide and an organic resin, an undercoat layer and a transparent electrode which are respectively made from an inorganic oxide are formed in this order on the inner opposing surface of each plastic substrate. Thus, a liquid crystal display having a hard coat layer serving as a buffer layer is provided. In this liquid crystal display, cracks in the undercoat layer and the transparent electrode and peeling between the plastic substrate and the undercoat layer are prevented.

9 Claims, 1 Drawing Sheet

LIQUID CRYSTAL DISPLAY

BACKGROUND OF THE INVENTION

1. Field of the Invention

The present invention relates to a liquid crystal display having a plastic substrate.

2. Description of the Related Art:

A plastic substrate is expected to be useful as a substrate for a liquid crystal display because of the following characteristics: It is thin, light, flexible and is difficult to break; it has satisfactory workability; and it is possible to form an element with a large surface area thereon. A conventional glass substrate does not have such characteristics.

Known liquid crystal displays having a plastic substrate are disclosed in Japanese Laid-Open Patent Publication Nos. 59-204545, 60-260019 and 55-114563.

The liquid crystal display disclosed in Japanese Laid-Open Patent Publication No. 55-114563 comprises a pair of plastic substrates 103 and a liquid crystal 110 sandwiched therebetween as is shown in FIG. 3. On the inner opposing surface of each of the plastic substrates 103 are successively formed an anchor agent layer 104, an undercoat layer 105 and a transparent electrode 106. On the outer surface of each of the plastic substrates 103 is formed another anchor agent layer 102. The plastic substrates 103 are sealed with a pair of sealing materials 109. The production method for such a liquid crystal display is as follows:

The plastic substrate 103 is dipped in a solution including an anchor agent such as amino silane and epoxy silane and dried to form the anchor agent layers 102 and 104 on its both surfaces. On the anchor agent layer 104, the undercoat layer 105 made from silicon oxide, etc. and the transparent electrode 106 are successively formed by sputtering, etc. Then, the plastic substrates 103 are set opposing each other, having the surfaces bearing the transparent electrodes 106, etc. facing each other, so as to sandwich the liquid crystal 110 therebetween by a known method. The opposing plastic substrates 103 are sealed with the sealing materials 109.

The anchor agent layer 104 is formed between the plastic substrate 103 and the undercoat layer 105 in order to improve adhesiveness therebetween. However, the plastic substrate 103 can be distorted by itself or due to a difference in the coefficients of the thermal expansion of the plastic substrate 103 and the undercoat layer 105. This distortion causes peeling between the plastic substrate 103 and the undercoat layer 105 or cracks in the undercoat layer 105 and the transparent electrode 106. These disadvantages are fatal to a liquid crystal display.

A use of a hard coat layer made from an organic resin such as organosilane resins, acrylic resins, melamine resins and urethane resins instead of the anchor agent layer 104 has been considered. In this case, however, the above-mentioned problems of peeling and cracks still remain.

SUMMARY OF THE INVENTION

The liquid crystal display of this invention comprises a pair of plastic substrates opposing each other and a liquid crystal sandwiched therebetween. A hard coat layer made from a resin composition including fine particles of silicon oxide and an organic resin, an undercoat layer and a transparent electrode which are respectively made from an inorganic oxide are formed in this order on the inner opposing surface of each plastic substrate.

In another aspect, the liquid crystal display comprises a pair of plastic substrates opposing each other and a liquid crystal sandwiched therebetween. A hard coat layer, an undercoat layer and a transparent electrode which are respectively made from an inorganic oxide are formed in this order on the inner opposing surface of each plastic substrate, and the hard coat layer includes fine particles of silicon oxide and an organic resin.

Thus, the invention described herein makes possible the advantages of (1) providing a liquid crystal display in which an undercoat layer and a transparent electrode are excellently adhered to a plastic substrate so as to prevent cracks in the undercoat layer and the transparent electrode; and (2) providing a liquid crystal display in which a hard coat layer serves as a buffer layer by containing fine powder of silicon oxide in the proportion of 20 to 60 wt % in the hard coat layer so that the undercoat layer and the transparent electrode are excellently adhered to each other.

These and other advantages of the present invention will become apparent to those skilled in the art upon reading and understanding the following detailed description with reference to the accompanying figures.

DESCRIPTION OF THE PREFERRED EMBODIMENTS

Figure 1:
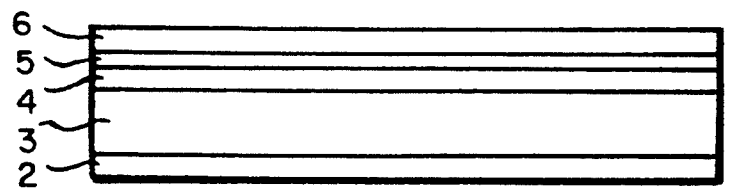
FIG. 1 is a sectional view of a part of a liquid crystal display according to an example of the present invention.

The liquid crystal display according to the present invention comprises a pair of plastic substrates opposing each other and a liquid crystal sandwiched between the plastic substrates. Each plastic substrate has a hard coat layer made from a resin compound including fine particles of silicon oxide and an organic resin, an undercoat layer and a transparent electrode respectively made from an inorganic oxide, all of which are formed in this order on the inner opposing surface.

Examples of the plastic substrate include a polyester resin plate, an acrylic resin plate, an epoxy resin plate and a polyethyl sulfone resin plate. The preferable thickness thereof is 0.1 to 0.5 mm.

Examples of the organic resin included in the hard coat layer include organosilane resins, acrylic resins, melamine resins and urethane resins.

Examples of the silicon oxide in the form of the fine particles contained in the hard coat layer include silicon dioxide and silicon monoxide. The particle size of the silicon oxide is preferably several thousand angstroms or less, more preferably 1000 angstroms or less. Silica anhydride in the form of super fine particles is especially preferred as the fine particles of the silicon oxide.

The fine particles of silicon oxide are contained in the hard coat layer, preferably in the proportion of 20 to 60 wt %, and more preferably 50 to 60 wt %. When the content of the fine particles of silicon oxide is within this range, the hard coat layer serves as a buffer layer between the plastic substrate and the undercoat layer. Thus, the adhesiveness between the hard cost layer and the undercoat layer is further improved, and a long lasting resistance which is required of a liquid crystal display can be satisfactorily attained.

When the content of the fine particles of silicon oxide is less than 20 wt %, the hard coat layer has unpreferably too strong affinity to the organic resin. When the content of the fine particles of silicon oxide exceeds 60 wt %, affinity of the hard coat layer to the inorganic resin is unpreferably too strong. In other words, when the content of the fine particles of silicon oxide is out of the above-mentioned range, the hard coat layer can not serve sufficiently as a buffer layer, resulting in causing cracks in the undercoat layer and the transparent electrode. The content of the fine particles of silicon oxide contained in the hard coat layer is determined by electron spectroscopy for chemical analysis (hereinafter referred to as the "ESCA").

The hard coat layer preferably has a thickness of 2 to 6 μm.

The undercoat layer is not limited to, but is generally made from silicon oxide (SiO and $SiO_2$). The layer can be made from $TiO_2$, $ZrO_2$, $Al_2O_3$, $Ta_2O_3$; $Nb_2O_3$ and the like.

The other elements of the liquid crystal display according to the present invention can be produced by a known method.

An example of the method for forming the hard coat layer is as follows: A solution of a resin compound including fine particles of silicon oxide, an organic resin and a solvent is coated on at least one surface of a plastic substrate by a dip method or a spin coat method. The resultant plastic substrate is then sintered.

Examples of the fine particles of silicon oxide include SNOWTEX (produced by Nissan Chemical Industries Ltd.; brand name) and REOLOSI (produced by Tokuyama Soda Corporation; brand name). Any solvent can be used if it has a sufficient wettability against the plastic substrate. Examples of the solvent include ethanol, butanol, and ispropyl alcohol.

The above described sintering is conducted at a temperature of 100° to 150° C. for 30 minutes to 3 hours, and preferably in air at a temperature of 110° to 120° C. for 120 minutes. The content of the fine particles of silicon oxide in the hard coat layer can be adjusted by properly controlling the constitution of the resin composition and the sintering condition.

The liquid crystal display according to the present invention comprises a hard coat layer including the fine particles of silicon oxide and an organic resin. Therefore, the hard coat layer can attain affinity to both organic materials and inorganic materials. As a result, the hard coat layer serves as a buffer layer. Due to this function, the hard coat layer can buffer various distortions of the plastic substrate caused by itself or due to a difference in the coefficients of the thermal expansion of the plastic substrate made from an organic material and the undercoat layer and the transparent electrode which are respectively made from an inorganic material. Therefore, the adhesiveness of the undercoat layer and the transparent electrode to the plastic substrate is improved.

EXAMPLES

The present invention will now be described by way of examples.

EXAMPLE 1

Figure 2:
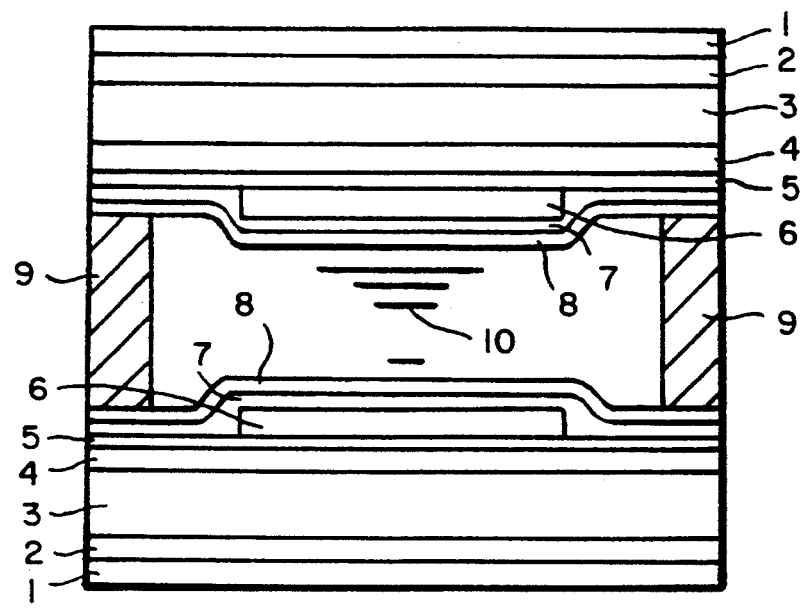
FIG. 2 is a sectional view of the entire liquid crystal display of FIG. 1.
Figure 3:
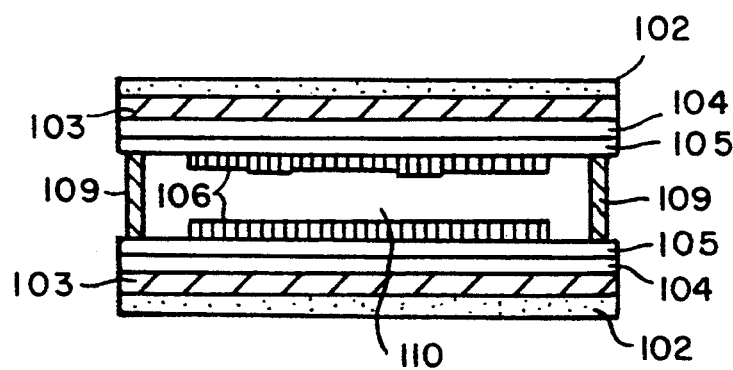
FIG. 3 is a sectional view of a conventional liquid crystal display.

FIG. 1 is a sectional view of a part of a liquid crystal display according to this example. FIG. 2 is a sectional view of the whole liquid crystal display according to this example. In FIGS. 1 and 2, the identical elements are indicated by the same reference numerals.

The liquid crystal display comprises a pair of plastic substrates 3 opposing each other and a liquid crystal 10 sandwiched therebetween. Each plastic substrate 3 has a hard coat layer 4, an undercoat layer 5 and a transparent electrode 6 formed in this order on the inner opposing surface, i.e., the surface facing the liquid crystal 10. The transparent electrode 6 is coated with a top coat layer 7 for protection, on which an orientation film 8 for the liquid crystal orientation is further provided. On the outside surface of the plastic substrate 3, i.e., the surface not facing the liquid crystal 10, another hard coat layer 2 and a deflection plate 1 are provided in this order. The plastic substrates 3 are sealed with sealing materials 9 for sealing the liquid crystal 10 between the plastic substrates 3.

Such a liquid crystal display was produced as follows: The plastic substrate 3 was dipped in a solution of a resin composition including the fine particles of silicon dioxide and an organic resin so as to coat the both surfaces of the substrate 3 with the resin composition. The plastic substrate 3 was then sintered so as to form the hard coat layers 2 and 4 each having a thickness of 3 μm on both surfaces of the plastic substrates 3. The content of the fine particles of silicon dioxide in the hard coat layer 4 was adjusted to be 30 wt %, which was confirmed by ESCA.

Next, the undercoat layer 5 made from $SiO_2$ with a thickness of 600 angstroms and the transparent electrode 6 made from ITO (a mixture of indium oxide and tin oxide) with a thickness of 2000 angstroms were successively formed on the hard coat layer 4 by sputtering.

The top coat layer 7 for protecting the transparent electrode 6 and the orientation film 8 for the orientation of the liquid crystal 10 were formed on the transparent electrode 6 by a known method.

A pair of the plastic substrates 3 bearing the above-mentioned layers were then set opposing each other as is shown in FIG. 2 with the liquid crystal 10 sandwiched therebetween, and the plastic substrates 3 were sealed up with the sealing materials 9. The hard coat layers 2 formed on the outside surface of the plastic substrates 3 were respectively provided with the deflection plates 1. Thus, the liquid crystal display of the present example was obtained.

In this liquid crystal display, the hard coat layer 4 includes the organic resin and the fine particles of silicon dioxide. Therefore, the hard coat layer 4 has an affinity to both the plastic substrate 3, that is, an organic material, and the undercost layer 5, that is, an inorganic material. This means that the hard coat layer 4 serves as a buffer layer for the plastic substrate 3 and the undercoat layer 5. Namely, the hard coat layer 4 can buffer various distortions of the plastic substrate 3 caused by itself or due to a difference in the coefficients of the thermal expansion of the plastic substrate 3 made from an organic material, and the undercoat layer 5 and the transparent electrode 6 respectively made from an inorganic material. As a result, the adhesiveness of the undercoat layer 5 and the transparent electrode 6 to the plastic substrate 3 is improved and the undercoat layer 5 and the transparent electrode 6 are prevented from having cracks in this liquid crystal display.

The liquid crystal display according to the present example was evaluated as follows:

The following tests were conducted in this order by using a unit having a structure as is shown in FIG. 1 as a sample for the evaluation.

1) The unit was dipped in an aqueous solution of 3 wt % NaOH at a temperature of 40° C. for 5 minutes.

2) The unit was sintered at a temperature of 170° C. for 2 hours.

3) The unit was allowed to stand for 1000 hours under the circumstances of a temperature of 45° C. and humidity of 95%. The unit was observed at 100 hours and 200 hours after the start of the test.

The test conditions of the above 1) and 2) correspond to those of the production process of the liquid crystal display such as etching and sintering. Test 3) is an environment test for a liquid crystal display.

EXAMPLE 2

A unit of a liquid crystal display was produced in the same manner as in Example 1 except that the hard coat layer 4 included 50 wt % of the fine particles of silicon dioxide. The obtained unit was also evaluated in the same manner as in Example 1.

COMPARATIVE EXAMPLE 1

A unit of a liquid crystal display was produced in the same manner as in Example 1 except that the hard coat layer 4 included no (0 wt %) fine particles of silicon dioxide. The obtained unit was also evaluated in the same manner as in Example 1.

COMPARATIVE EXAMPLE 2

A unit of a liquid crystal display was produced in the same manner as in Example 1 except that the hard coat layer 4 included 10 wt % of the fine particles of silicon dioxide. The obtained unit was also evaluated in the same manner as in Example 1.

As for all the units of the liquid crystal displays obtained in Examples 1 and 2 and Comparative Examples 1 and 2, the undercoat layers 5 and the transparent electrodes 6 were visually observed after the above-mentioned evaluation. The results are shown in Table 1 below.

TABLE 1

| | Content of Silicon | Test 1 | Test 2 | 100 hrs | Test 3 200 hrs | 1000 hrs |
|---|---|---|---|---|---|---|
| Com. Ex. 1 | 0 | ○ | — | — | — | — |
| Com. Ex. 2 | 10 | Δ | Δ | Δ | ○ | — |
| Ex. 1 | 30 | X | X | X | X | X |
| Ex. 2 | 50 | X | X | X | X | X |

In Table 1, ○ indicates that cracks were visually observed, Δ indicates that cracks were observed by a microscope although they were not visually observed, and x indicates no cracks were observed visually or by microscope. The samples in which a crack was observed could not be subjected to the subsequent test, which is shown with -.

The results shown in Table 1 show the following: In the samples including the fine particles of silicon dioxide in the proportion of 0 or 10 wt % (Comparative Examples 1 and 2), cracks could not be avoided in the above-mentioned evaluation. In the samples including the fine particles of silicon dioxide in the proportion of 30 wt % or 50 wt % (Examples 1 and 2), cracks could be avoided and the adhesiveness of the undercoat layer 5 and the transparent electrode 6 to the plastic substrate 3 was excellent.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display comprising a pair of plastic substrates opposing each other and a liquid crystal sandwiched therebetween, wherein a hard coat layer made from a resin composition including fine particles of silicon oxide and an organic resin, an undercoat layer and a transparent electrode which are respectively made from an inorganic oxide are formed in this order on the inner opposing surface of each plastic substrate and the hard coat layer includes the fine particles of silicon oxide in the proportion of 20 to 60 wt %.

2. A liquid crystal display according to claim 1, wherein the hard cost layer includes the fine particles of silicon oxide in the proportion of 50 to 60 wt %.

3. A liquid crystal display according to claim 1, wherein the fine particles of silicon oxide included in the resin composition is silica anhydride in the form of super fine particles.

4. A liquid crystal display according to claim 1, wherein the organic resin is selected from the group consisting of organosilane resins, acrylic resins, melamine resins and urethane resins.

5. A liquid crystal display according to claim 1, wherein the plastic substrate is made from one selected from the group consisting of acrylic resins and epoxy resins.

6. A liquid crystal display according to claim 1, wherein the inorganic oxide is at least one selected from the group consisting of silicon oxide, $TiO_2$, $ZrO_2$, $Al_2O_3$, $Ta_2O_3$ and $Nb_2O_3$.

7. A liquid crystal display comprising a pair of plastic substrates opposing each other and a liquid crystal sandwiched therebetween, wherein a hard coat layer, and undercoat layer which is made from an inorganic oxide, and a transparent electrode are formed in this order on the inner opposing surface of each plastic substrate, and the hard coat layer includes fine particles of silicon oxide in the proportion of 20 to 60 wt % and an organic resin.

8. A liquid crystal display according to claim 7, wherein the transparent electrode is made of a mixture of indium oxide and tin oxide.

9. A liquid crystal display according to claim 7, wherein the hard coat layer has a thickness of 2 to 6 μm.

* * * * *